Aug. 19, 1947.  S. J. BEEBE  2,425,718
SUGAR DISPENSER
Filed Feb. 7, 1945
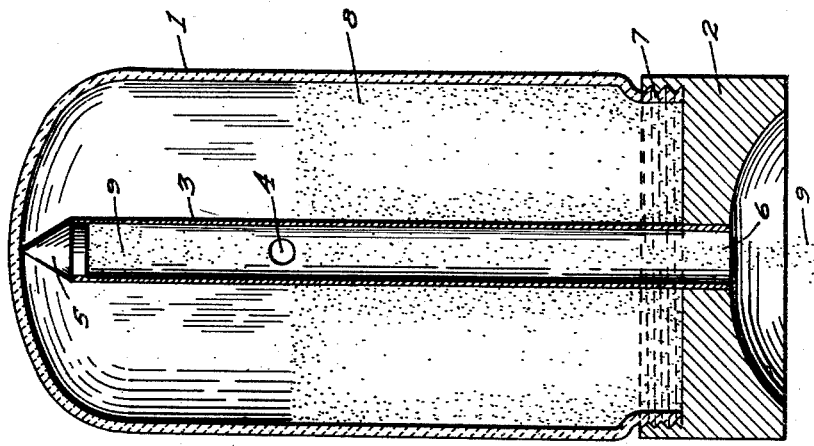
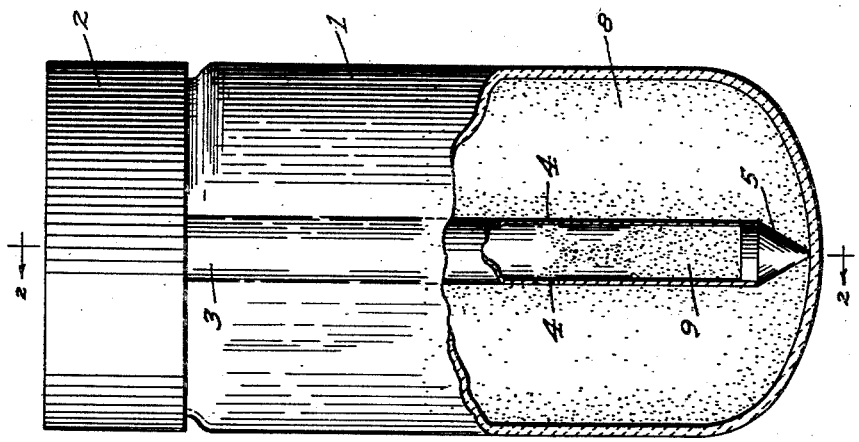
INVENTOR
S. J. Beebe
BY Lester L. Sargent
ATTORNEY Patented Aug. 19, 1947

2,425,718

UNITED STATES PATENT OFFICE 2,425,718

SUGAR DISPENSER

Stanley J. Beebe, Norfolk, Va.

Application February 7, 1945, Serial No. 576,634

1 Claim. (Cl. 222—456)

The object of my invention is to provide a novel sugar dispenser which will prevent moisture from getting into the container and interfering with the free dispensing of the sugar. It is also an object of my invention to provide a sugar dispenser which is attractive in appearance and which will not easily tip over.

It is a further object of my invention to provide a device having a disepnsing tube which can be easily inserted in the container when it is full of sugar. It is also a further object of my invention to provide a sugar dispenser having the portion which holds the sugar made of transparent material, either glass or plastic, so that the amount of sugar in it can be determined at a glance. I attain these and other objects of my invention by the device illustrated in the accompanying drawings in which, Figure 1 is a side elevation of the device in inverted position, but with the base in place, a portion of the sugar container and a portion of the dispensing tube being shown in section; and Fig. 2 is a vertical section through my device in upright position for use, and also showing how the base may be removed from the sugar container for the purpose of filling.

Like numerals designate like parts in each of the views.

Referring to the accompanying drawings, I provide a suitable sugar container 1 of preferably transparent plastic, or of glass, having a screw-threaded lower end 7, to which the base 2 has threaded engagement. Mounted on the center portion of the base 2 is a hollow, preferably cylindrical, tube 3, having dispensing openings 4, preferably opposite, positioned some distance downward from the top of the tube. This tube terminates in a conical cap 5 whereby to permit of its readily being inserted in the sugar, that is in the container 1, after the container 1 has been filled. The conical cap 5 extends to the top of the inside of the container 1 as shown in Fig. 2. The sugar in the body of the container is designated as 8 and the sugar ready to flow down the dispensing tube 3 is designated as 9.

In operation the container is filled by unscrewing the base 2 from the lower end of the container body 1. As shown in the drawings, the tube 3 has a conical cap or end 5 which extends substantially to the top of the container 1, to make it easy to insert the tube through the sugar. The tube 3 has opposite holes 4, as shown in Figs. 1 and 2, spaced a short distance down from the top or upper end of the tube, this distance varying with the diameter of the tube, so that the tube will hold in the space between the holes 4 and the upper end 5 of the tube a teaspoon full of sugar. The device normally is seated on the table in the position shown in Fig. 2. When it is taken up and inverted the sugar will flow into the holes 4 and fill the tube from that point to its end. Then the flow of sugar stops. Then when the dispenser is again returned to normal position one teaspoon of sugar will flow out through the bottom end of the tube. It may be shaken to hasten the flow of sugar to fill the tube to the holes, when inverted, but the shaking is not necessary. The fact is that a teaspoon of sugar will flow through the side holes 4 in so short a time it is not necessary to shake at all. The dispenser functions simply from tipping it bottom end up and then reversing it, thus pouring out the teaspoonful of sugar that has entered into the tube from the side holes or apertures 4 and which fills the tube from the plane in which the apertures 4 are positioned to the conical end 5. There is never any sugar in the discharge tube until it is picked up and inverted, and when it is tipped back to normal position the tube is emptied and the dispenser set down. With each inversion of the container the sugar is shifted from its dormant position and thus it is kept from standing and perhaps getting packed. The reason for the conical cap 5 is to permit the tube's being easily inserted into the container when it is virtually full of sugar. The base section 2 is preferably made of plastic material.

The apertures 4 (preferably opposite) are preferably about one-half the distance from the tip of the conical point 8 to its lower end. The device delivers a definite amount of sugar at each tipping or inverting of the container, the amount depending on how far the inlet apertures are from the sealed end.

What I claim is:

A sugar dispenser comprising a transparent container having an open lower end, a base removably attached to said lower end of the transparent container, a tube affixed to the base and discharging sugar through the base, said tube extending substantially the length of the container, the tube having opposite apertures in the sides of the tube spaced a sufficient distance from the upper end of the tube to permit a predetermined amount of sugar to flow into the tube when inverted to fill it from its upper end to the apertures, the tube having a pointed tip to permit of its convenient insertion through the sugar in the container when refilling the container, the diameter of the tip not exceeding that of the tube, the sugar in the tube being dispensed by again returning the container to its original position with the open end of the tube down to discharge sugar.

STANLEY J. BEEBE.

REFERENCES CITED

The following references are of record in the file of this patent:

UNITED STATES PATENTS

| Number | Name | Date |
|---|---|---|
| 1,763,449 | Trautvetter | June 10, 1930 |
| 1,941,745 | Higley | Jan. 2, 1934 |
| 1,217,078 | Schreidt | Feb. 20, 1917 |
| 1,270,262 | Buckland | June 25, 1918 |